United States Patent
Kondo

(10) Patent No.: US 9,285,625 B2
(45) Date of Patent: Mar. 15, 2016

(54) DISPLAY DEVICE

(71) Applicant: Japan Display Inc., Tokyo (JP)

(72) Inventor: Yasuaki Kondo, Tokyo (JP)

(73) Assignee: Japan Display Inc., Tokyo (JP)

( * ) Notice: Subject to any disclaimer, the term of this patent is extended or adjusted under 35 U.S.C. 154(b) by 2 days.

(21) Appl. No.: 14/217,583

(22) Filed: Mar. 18, 2014

(65) Prior Publication Data

US 2014/0267989 A1    Sep. 18, 2014

(30) Foreign Application Priority Data

Mar. 18, 2013    (JP) .................................. 2013-054519

(51) Int. Cl.
*G02F 1/1335*    (2006.01)
*G02F 1/1333*    (2006.01)

(52) U.S. Cl.
CPC .... *G02F 1/133512* (2013.01); *G02F 1/133308* (2013.01); *G02F 2001/13332* (2013.01); *G02F 2001/133331* (2013.01); *G02F 2202/28* (2013.01)

(58) Field of Classification Search
CPC ...................... G02F 1/133512; G02F 1/133308
USPC .................................... 349/110, 58
See application file for complete search history.

(56) References Cited

U.S. PATENT DOCUMENTS

| | | | |
|---|---|---|---|
| 2010/0245707 A1* | 9/2010 | Harada | 349/58 |
| 2012/0200796 A1* | 8/2012 | Harayama et al. | 349/43 |
| 2012/0235048 A1* | 9/2012 | Kim | G02F 1/133308 250/372 |

FOREIGN PATENT DOCUMENTS

JP    2011-7830    1/2011

* cited by examiner

*Primary Examiner* — Thanh-Nhan P Nguyen
(74) *Attorney, Agent, or Firm* — Typha IP LLC

(57) ABSTRACT

A display device includes: a display panel, a protective plate provided in a front surface of the display panel to protect the display panel; and a light shielding film. The protective plate is fixed to the display panel by a transparent adhesive applied to an area between the display panel and the protective plate. The light shielding film is formed so as to surround a display area of the display panel, including a first light shielding film formed in a frame shape, and a second light shielding film deposited on the first light shielding film. The second light shielding film has a cut-out area where the second light shielding is not formed in at least one or more corner portions of the protective plate. A concave portion is formed in the corner portion of the light shielding film from an inner peripheral edge to an outer peripheral edge.

11 Claims, 6 Drawing Sheets

DISPLAY DEVICE

CLAIM OF PRIORITY

The present application claims priority from Japanese Patent Application JP 2013-54519 filed on Mar. 18, 2013, the content of which is hereby incorporated by reference into this application.

BACKGROUND

The present invention relates to a display device, and more particularly to a display device including a protective plate provided in the front surface of a display panel to protect the display panel.

In portable information terminals such as a mobile phone with a liquid crystal display device as a display device, the liquid crystal display device is formed by a liquid crystal display panel and a backlight device for emitting illumination light to the liquid crystal display panel. In general, the display device has a module structure in which a protective plate (front window) is fixed to the front surface (observer side surface) of the liquid crystal display device to protect the liquid crystal display panel formed of a glass substrate.

In the display device with the module structure, a frame-like light shielding film is printed on the back surface of the protective plate, namely, on the surface facing the liquid crystal display panel so as to surround the display area of the liquid crystal display panel. In particular, in order to prevent leakage of illumination light emitted from the backlight device to the outside from the periphery of the liquid crystal display module, the back surface of the protective film is recoated with the light shielding film to improve the light shielding performance.

Further, in the liquid crystal display module with this configuration, the protective plate is fixed to the liquid crystal display panel by an adhesive of thermosetting resin or photocurable resin. In this case, the adhesive is dropped on the front surface of the liquid crystal display panel, and the protective plate is placed on the top surface of the adhesive. Then, the adhesive is cured to form an adhesive layer between the liquid crystal display panel and the protective plate. In this way, the protective plate is fixed to the liquid crystal display panel.

However, the back surface of the protective plate has a difference in level due to the printing of the light shielding film. This leads to a problem that bubbles are generated in the step portion when the adhesive is applied over the back surface of the protective film, and thus the product quality is significantly reduced.

As a method for solving this problem, for example, there is a display device described in Japanese Unexamined Patent Application Publication No. 2011-7830. In the display device described in Japanese Unexamined Patent Application Publication No. 2011-7830, when the light shielding film is formed by recoating, the light shielding film is printed to form a step on the inner peripheral side of the light shielding film, to reduce the difference in level between the area where the light shielding film is not formed and the area recoated with the light shielding film, in order to prevent bubbles from forming in the step portion.

SUMMARY OF THE INVENTION

In recent years, there has been a significant increase in the number of display pixels in the portable information terminal in order to improve the display quality of the liquid crystal display device in a housing of a limited size. At the same time, it is desirable to reduce the peripheral portion of the display area, which does not contribute to image display, a so-called narrow frame. It is also desirable to make the liquid crystal display device thinner while further increasing the transmittance. In order to achieve these requirements, the film thickness of the adhesive layer is made very thin with a very small amount of adhesive applied to bond the liquid crystal display panel and the protective plate.

In particular, as shown in FIG. 6, the protective plate FW includes a light shielding film PM that is formed by recoating with a first light shielding film PM1 of a frame shape and a second light shielding film PM2. In the bonding between the protective plate FW and the liquid crystal display panel, if the adhesive is squeezed out from the end of the liquid crystal display panel and the protective plate FL, it is necessary to remove the squeezed out adhesive, so that the production efficiency is reduced. For this reason, an appropriate amount of adhesive is applied in the bonding process. Thus, in the bonding between the liquid crystal display panel and the protective plate FW, in the corner portion where the adhesive is difficult to flow and spread than in the side portion, as shown in FIG. 7 which is a cross-sectional view taken along line D-D of FIG. 6, there is a problem of the formation of bubbles in the portion indicated by the arrow Y1 which is the boundary between the first light shielding film PM1 and the protective plate FW, even if the technology disclosed in Japanese Unexamined Patent Application Publication No. 2011-7830 is used. Thus, it is desirable to develop a method for solving this problem.

The present invention has been made in view of the above problems, and an object of the present invention is to provide a display device that can prevent bubbles from forming also in the corner portion of the light shielding film printed on the protective plate.

To solve the above problems, the present invention provides a display device including: a display panel; a protective plate provided in a front surface of the display panel to protect the display panel; and a light shielding film formed along a peripheral portion of the protective plate. The protective plate is fixed to the front surface of the display panel by a transparent adhesive that is applied to an area between the display panel and the protective plate.

The light shielding film is formed so as to surround a display area of the display panel. The light shielding film includes a first light shielding film formed in a frame shape, and a second light shielding film deposited on the first light shielding film.

The second light shielding film has a cut-out portion where the second light shielding film is not formed in at least one or more corner portions of the protective plate.

A concave portion is formed in the corner portion of the light shielding film from an inner peripheral edge to an outer peripheral edge.

According to the present invention, it is possible to prevent bubbles from forming also in the corner portion of the light shielding film printed on the protective plate.

These and other advantages of the present invention will be apparent from the description of the present specification.

DETAILED DESCRIPTION

Figure 1:
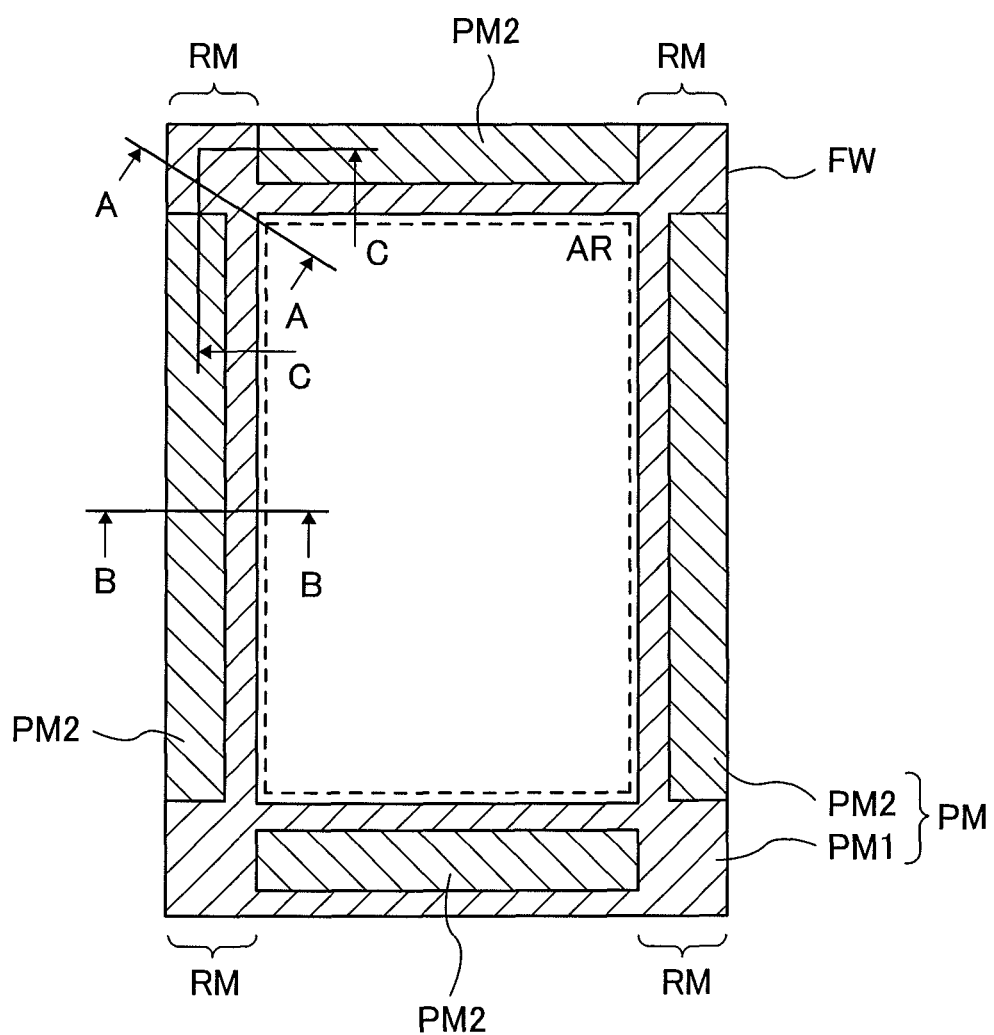
FIG. 1 is a plan view showing a schematic configuration of a liquid crystal display device which is a display device according to a first embodiment of the present invention.

Hereinafter, embodiments to which the present invention is applied will be described with reference to the accompanying drawings. However, the same components are identified by the same reference numerals and the repetitive description thereof will be omitted in the following description.

First Embodiment (Overall configuration)

FIG. 1 is a plan view showing a schematic configuration of a liquid crystal display device which is a display device according to a first embodiment of the present invention. Hereinafter, the configuration of a protective plate FW of the display device according to the first embodiment will be described based on FIG. 1. In the following, it is assumed that the protective plate FW is bonded to the front surface of a display panel PNL formed by a liquid crystal display panel and a backlight device. However, other display panels such as a known organic EL display panel may be used. The present invention can also be applied to the configuration in which the protective plate FW is bonded to the front surface of a display panel in which a coordinate input device such as a known touch panel is provided in the front surface of the liquid crystal display panel or in the front surface of the organic EL display panel. Further, the present invention can also be applied to the configuration in which a protective film for glass scattering prevention is formed on the formation surface of the light shielding film PM of the protective plate FW, namely, on the back surface of the protective plate FW.

As shown in FIG. 1, the liquid crystal display device according to the first embodiment includes a display panel PNL formed by a known liquid crystal display panel having a display area AR indicated by a dashed line in the figure, and a known backlight device (backlight unit) provided on the back surface of the liquid crystal display panel. A translucent protective plate FW, which is also called a front window, is provided in the front surface of the display panel PNL, namely, on the side where the observer observes the displayed image, to protect the liquid crystal display panel in which a pair of glass substrates (transparent substrates) are arranged to face each other with a liquid crystal layer therebetween.

For example, the liquid crystal display panel is configured such that a first substrate (TFT substrate) in which a thin film transistor and the like are formed as described below, and a second substrate (color filter substrate (CF substrate)) in which color filters of red (R), green (G), and blue (B) are formed corresponding to the pixels, are arranged to face each other with a liquid crystal interposed therebetween. The first substrate includes multiple image signal lines (drain lines), not shown, extending in the long side direction in the figure, as well as multiple scan signal lines (gate lines) extending in the short side direction. An area surrounded by the drain lines and the gate lines forms a pixel area. Further, a thin film transistor, which is turned on and off by the scan signal from the gate line, is provided in the vicinity of the intersection of the drain and gate lines. When the thin film transistor is turned on, an image signal from the drain line connected to the drain electrode is output to the pixel electrode connected to the source electrode. The second substrate is configured such that the RGB color filters, each of which corresponds to each pixel, form unit pixels for color display. Further, at least one side of the second substrate is made smaller than the first substrate. Then, a known flexible wiring substrate for inputting image signals from the outside, as well as a drive circuit for generating image signals and scan signals are mounted on the opposite surface of the first substrate that is exposed from the second substrate. In other words, the flexible wiring substrate and the drive circuit are mounted on the surface on the side of the liquid crystal display layer.

In the liquid crystal display panel with this configuration, the second substrate is provided on the side of the image display surface, namely, on the side of the observer. Thus, in the liquid crystal display device according to the first embodiment, the protective plate FW is bonded to the surface of the second substrate. In the bonding between the display panel PNL and the protective plate FW according to the first embodiment, for example, a predetermined amount of adhesive (for example, a translucent adhesive of a known thermosetting resin) AD is dropped on the front surface of the display panel PNL at multiple locations corresponding to the display area AR in a matrix. Then, the protective plate FW on which the light shielding film PM is printed is deposited on top surface to spread the adhesive AD between them. Then, the adhesive AD is heated and cured to cover the front surface of the display panel PNL by the layer of the transparent adhesive AD, while fixing the protective plate FW to the display panel PNL. At this time, the protective plate FW and the display panel PNL are bonded so that the adhesive AD is not applied to the drive circuit and the connection terminal portion.

In the protective plate FW provided (bonded) to the front surface of the display panel PNL, the frame-like light shielding film PM is formed by screen printing along the peripheral edge of the protective plate FW, which will be described in detail below. Further, the light shielding film PM is formed so as to surround the display area AR of the display panel PNL. Note that the formation method of the light shielding film PM is not limited to screen printing. Other printing techniques and formation techniques such as vapor deposition may be used.

The light shielding film PM according to the first embodiment is formed by two layers of the light shielding films PM1, PM2 with different outer shapes as described in detail below. With this configuration, even if the cause of the leakage of light, such as backlight beam, occurs due to the formation of a pinhole and the like on one light shielding film, the other light shielding film can prevent the light leakage. At this time, the light shielding film PM according to the first embodiment is configured such that the first light shielding film PM1, which is one of the light shielding films, has a frame-like outer shape that is circularly printed along the peripheral edge of the protective plate FW. Further, the second light shielding film PM2, which is the other light shielding film, is formed by four linear films along each of the peripheral edges of the protective plate FW. The linear light shielding films are separated from each other in each of the corner portions.

In other words, in the configuration of the light shielding film PM according to the first embodiment, the first light shielding film PM1 is formed around the display area AR of the display panel PNL, similarly to the conventional light shielding film. The second light shielding film PM2, which is formed on the top surface of the first light shielding film PM1, is formed in the side edge except the area of the corner portions of the protective film FW. In other words, the second light shielding film PM2 is formed in the side edge, which is the area except the area of the corner portions of the top surface of the first light shielding film PM1.

As a result, in the second light shielding film PM2 according to the first embodiment, a cut-out area RM, which is the area where the second light shielding film PM2 is not formed (printed), is formed in each corner portion of the protective plate FW. Note that each of the linear light shielding films forming the second light shielding film PM2 is also referred to as the second light shielding film PM2 in the following description.

(Detailed Configuration of the Light Shielding Film)

Figure 2:
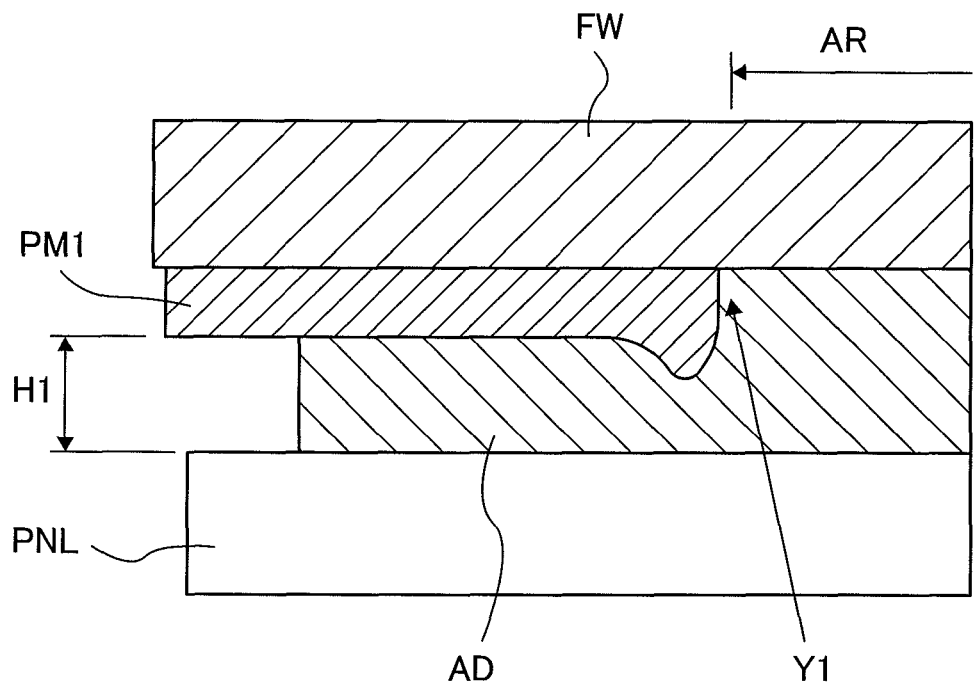
FIG. 2 is a cross-sectional view taken along line A-A shown in FIG. 1.
Figure 3:
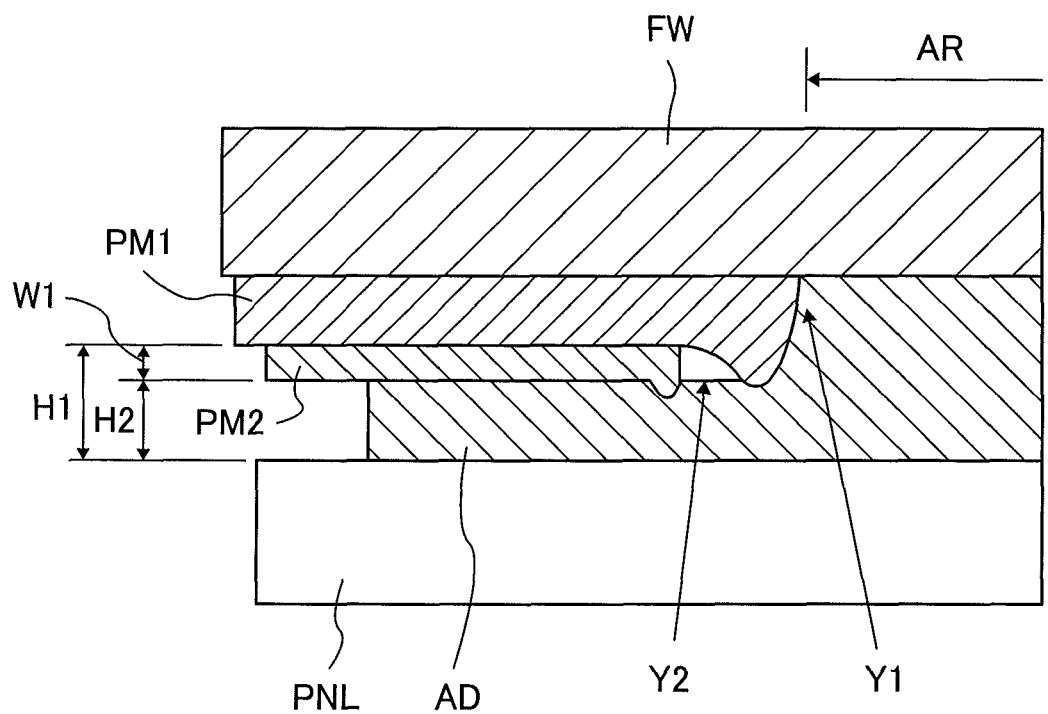
FIG. 3 is a cross-sectional view taken along line B-B shown in FIG. 1.
Figure 4:
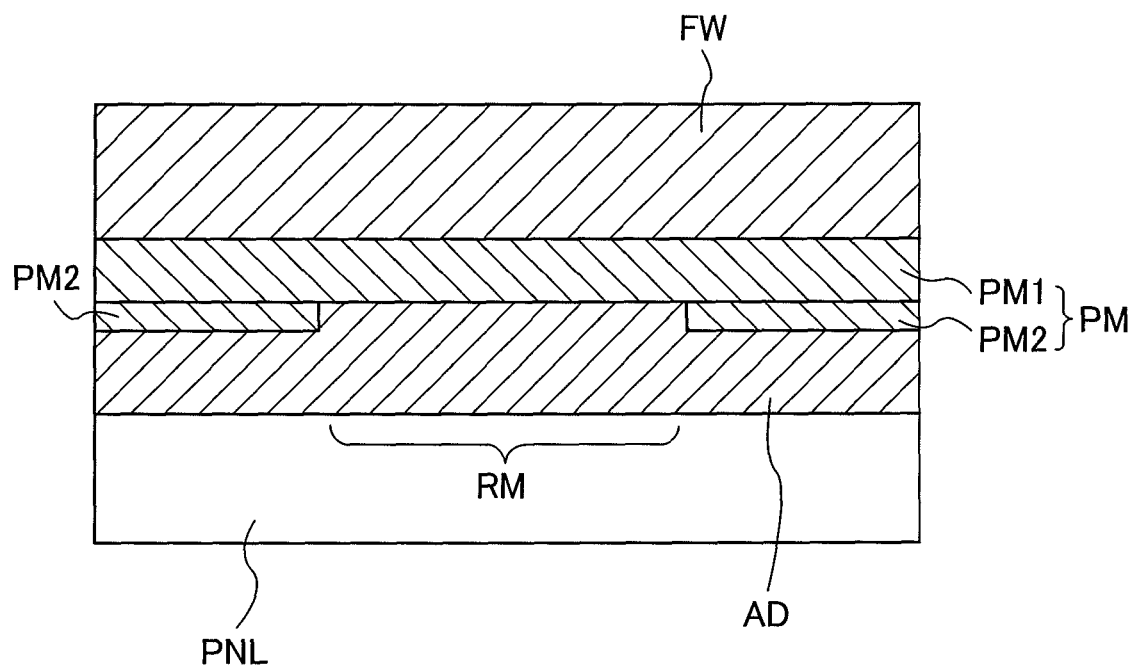
FIG. 4 is a cross-sectional view taken along line C-C shown in FIG. 1.

Next, FIG. 2 is a cross-sectional view taken along line A-A in FIG. 1, FIG. 3 is a cross-sectional view taken along line B-B in FIG. 1, and FIG. 4 is a cross-sectional view taken along line C-C in FIG. 1. Hereinafter, the detailed configuration of the light shielding film according to the first embodiment, as well as the effect of preventing the formation of bubbles in the bonding between the protective plate FW and the display panel PNL will be described.

In general, when the light shielding film PM is formed (printed) by screen printing, the edge on the print end side is raised from the printed surface. In other words, a concave portion is formed in the normal line direction of the printed surface. Here, in the liquid crystal display device according to the first embodiment, the light shielding film PM is formed by printing a light shielding material (black paint, and the like) from the left side to the right side in FIG. 1. Thus, in the light shielding film PM formed in the peripheral edge of the protective plate FW shown in FIG. 1, the concave portion is formed at the edge on the side of the display area AR in the light shielding film PM formed along the side edge on the left side in FIG. 1, of the light shielding films PM formed along the side edges on the long side of the display device, namely, of the light shielding films PM formed along the left side edge and the right side edge in FIG. 1.

Thus, in the difference in level between the area where the light shielding film PM is not printed (the opening area) and the area where the light shielding film PM is formed, the edge on the side of the display area AR is the print end side in the light shielding film PM formed along the side edge on the left side in FIG. 1. Thus, this portion projects from the other part of the light shielding film PM. In other words, in the bonding of the protective plate FW, the adhesive AD is difficult to spread over the area where the light shielding film PM is formed. Thus, the portion (shown in FIGS. 2 and 3) of the light shielding film PM formed along the side edge on the left side in FIG. 1 will be described in detail below.

As is apparent from FIG. 3, in the cut-out area RM of the second light shielding film PM2, which is the area formed in the corner area of the portative plate FW in which the second light shielding film PM2 is not formed, only the first light shielding film PM1 is printed on the back surface (opposite surface) of the protective plate FW. In other words, in the cut-out area RM of the second light shielding film PM2, the light shielding film PM is formed by single-layer printing. In the cut-out area RM in which the light shielding film PM is formed by only the first light shielding film PM1, the liquid adhesive AD applied to the front surface of the display panel PNL flows and spreads from right to left in FIG. 3, due to the wet spreading by itself and the pressing force of the protective plate FW. Then, the protective plate FW is fixed (bonded) to the front surface of the display panel PNL through the layer of the adhesive AD by the curing process of the adhesive AD. In other words, the liquid adhesive AD dropped on the area corresponding to the opening portion of the light shielding film PM reaches the inner peripheral edge of the first light shielding film PM1. Then, the adhesive AD flows and spreads on the outer peripheral side between the first light shielding film PM1 and the display panel PNL. The adhesive AD is cured when the distance between the protective plate FW and the display panel PNL is a predetermined value.

In the cut-out area RM where the second light shielding film PM2 is not formed, as is apparent from FIG. 3, only the first light shielding film PM1 forms the step for preventing the adhesive AD from flowing and spreading, which is the cause of the formation of bubbles in the inner peripheral edge of the light shielding film PM. In other words, the adhesive AD beyond the side wall surface on the inner peripheral side, which is the inner peripheral edge of the first light shielding film PM1, only flows and spreads in the outer peripheral direction in the area between the first light shielding film PM1 and the display panel PNL. For this reason, the adhesive AD can flow and spread in the same manner as in the side portion. As a result, as shown in FIG. 3, a sufficient amount of adhesive AD is allowed to enter (fill) the space where the light shielding film, namely, the side wall portion of the first light shielding film PM1 comes into contact with the opposite surface of the protective plate FW. Thus, it is possible to significantly reduce the formation of bubbles also in this space.

In other words, as shown in FIG. 4, the cut-out area RM, which is the area where the second light shielding film PM2 is not formed, is formed in the corner portion of the protective plate FW. Because of this cut-out area RM, a concave area is formed in the first light shielding film PM1 from the inner peripheral side to the outer peripheral side on the top side of the first light shielding film PM1. In the concave area, as is apparent from FIG. 4, the first light shielding film PM1 is the bottom of the concave area, and the side wall surface of the second light shielding film PM2 forms the inner wall surface of the concave area. Thus, the volume of the concave area is greater than the side portion where the second light shielding film PM2 is formed. Thus, the formation of the concave portion of the cut-out area RM can facilitate the adhesive AD to spread also in the corner portion where the adhesive AD is more difficult to spread (flow) than in the side portion in the conventional configuration. As a result, it is possible to assure the flow of the adhesive AD enough to prevent the formation of bubbles also in the area where the side wall of the second light shielding film PM2 comes into contact with the opposite surface of the protective plate FW. In this way, the formation of bubbles can be prevented without adding any special process. In addition, the formation of bubbles can be further prevented by increasing the filling amount of the adhesive AD to more than the conventional one.

In particular, in the configuration of the light shielding film PM according to the first embodiment, the cut-out area RM, which is the area where the second light shielding is removed, is formed in all four corner portions of the protective plate FW. With this configuration, the adhesive AD can easily flow into the four corner portions, namely, the four corners of the protective plate FW. This makes it possible to reduce the bubble formation and the squeeze-out of the adhesive AD at the same time. As a result, it is possible to significantly reduce operations such as repair of the display device associated with a defective product due to the bubble formation and the squeeze-out of the adhesive AD. Thus, the yield and workability can be improved.

In the side portion of the light shielding film PM according to the first embodiment, the light shielding film PM is configured such that the first light shielding film PM1 and the second light shielding film PM2 are formed along the side portion of the protective plate FW. In other words, as shown in FIG. 3, in the side portion of the light shielding film PM, the first light shielding film PM1 is formed on the back surface of the protective plate FW, and the second light shielding film PM2 is deposited on the top surface of the first light shielding film PM1. At this time, also in the printing of the light shielding film PM according to the first embodiment, similarly to the conventional light shielding film, the edge of the second light shielding film PM2 on the side of the display area AR (the opening side) is offset to the outer peripheral side of the protective plate FW than the edge on the side of the display area AR of the first light shielding film PM1. With this configuration, even if the light shielding film PM is formed by two-time printing such that the first light shielding film PM1 formed by the first printing and the second light shielding film PM2 formed by the second printing, the difference in level at the edge of the light shielding film PM, which is the cause of preventing the adhesive AD from spreading, is made small. As a result, also in the side portion of the light shielding film PM according to the first embodiment, it is possible to prevent the formation of bubbles in the area indicated by the arrow Y1 in the figure, namely, at the edge on the side of the display area AR of the first light shielding film PM1.

Further, as shown in FIG. 3, the edge of the first light shielding film PM1 projects convexly from the edge on the side of the display area AR of the second light shielding film PM2. Thus, bubbles are relatively likely to occur at the edge on the side of the display area AR of the second light shielding film PM2, which is the area indicated by the arrow Y2 in FIG. 3. However, the area indicated by the arrow Y2 is the area shielded by the first light shielding film PM1. Thus, even if bubbles are generated in this area, the generated bubbles are covered by the first light shielding film PM1 from the side of the observer, and this is not the cause of reducing the quality of the product.

In particular, the first light shielding film PM1 according to the first embodiment has a thickness with sufficient light shielding performance to block the light, such as the backlight beam, only by the first light shielding PM1. Note that the second light shielding film PM2 is the light shielding film for preventing the cause of the reduction in the light shielding performance due to the pinhole and the like formed in the first light shielding film PM1. Thus, in the configuration according to the first embodiment, the film thickness of the second light shielding film PM2 is smaller than the film thickness of the first light shielding film PM1. However, it is also possible that the first light shielding film PM1 and the second light shielding film PM2 have the same film thickness, or the film thickness of the second light shielding film PM2 is greater than the film thickness of the first light shielding film PM1.

Further, as is apparent from FIGS. 2 and 3, in the configuration of the display device according to the first embodiment, the distance between the display panel PNL and the light shielding film PM in the side portion, namely, in the area where the second light shielding film PM2 is formed, is the distance H2 between the display panel PNL and the second light shielding film PM2, and thus H2=H1−W1 where the distance between the first light shielding film PM1 and the display panel PNL is H1 and the film thickness of the second light shielding film PM2 is W1. On the other hand, the second light shielding film PM2 is not formed in the corner portion. Thus, the distance between the display panel PNL and the light shielding film PM is the distance H1 between the display panel PNL and the first light shielding film PM1.

In other words, in the corner portion of the display device according to the first embodiment, the adhesive AD can be accumulated more than in the side portion by the volume corresponding to the second light shielding film PM2. As a result, the amount of the adhesive AD applied to the vicinity of the corner portion can be increased more than the conventional one. Thus, the formation of bubbles can be prevented more effectively. Further, a greater amount of adhesive AD can be accumulated, so that the amount of adhesive AD squeezed out of the peripheral portion can be significantly reduced. As a result, when the display device according to the first embodiment is used in a portable information terminal such as a mobile phone, the peripheral portion called a bezel of the particular mobile information terminal can be made thin (narrow).

Note that in the display device according to the first embodiment, the second light shielding film PM2 is continuously formed from one corner portion to the other corner portion along the side portion of the protective plate FW. However, the present invention is not limited to the exemplary embodiment. For example, one or more areas where the second light shielding film PM2 is not formed may be formed at least along the side portion of the protective plate FW. It is also possible to form the second light shielding film PM2 in dotted lines.

Second Embodiment

Figure 5:
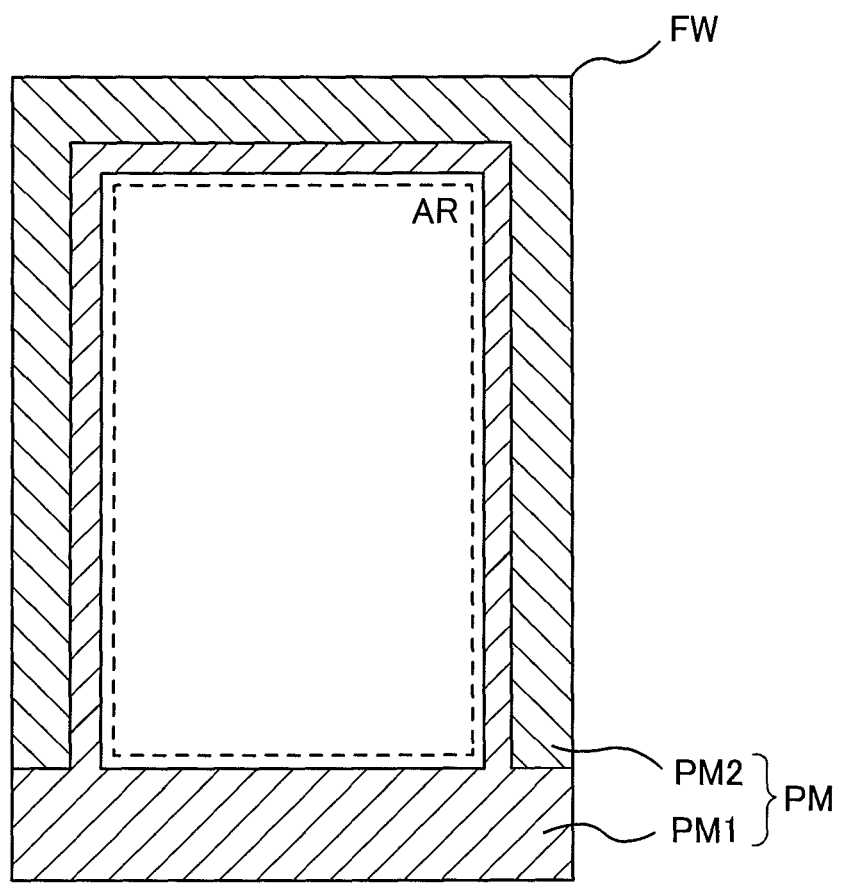
FIG. 5 is a plan view showing a schematic configuration of a liquid crystal display device which is a display device according to a second embodiment of the present invention.
Figure 6:
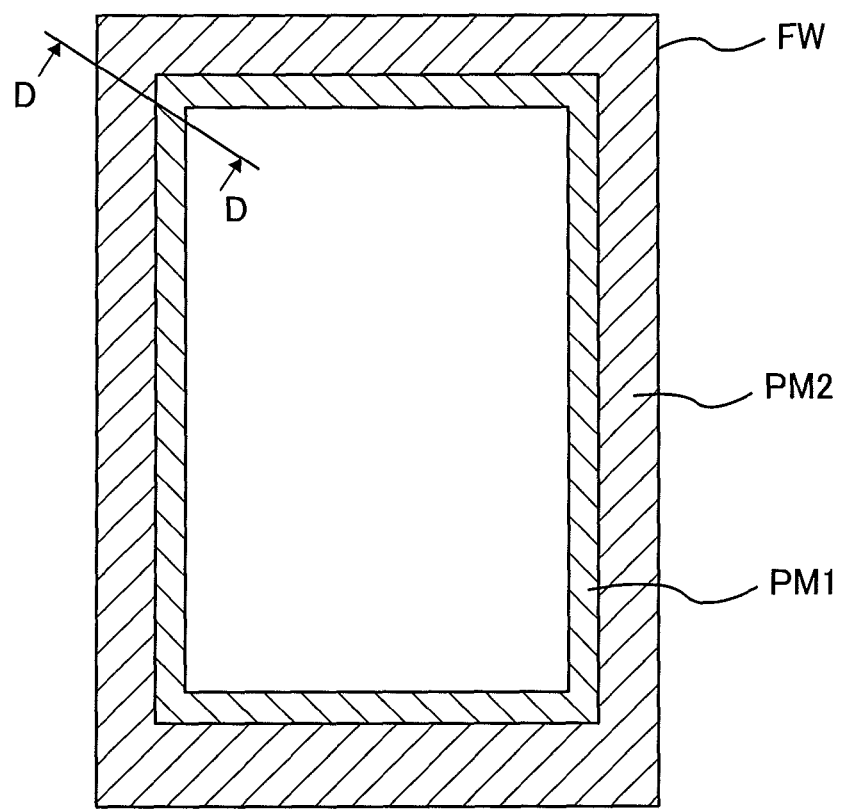
FIG. 6 is a plan view showing a schematic configuration of a conventional liquid crystal display device.
Figure 7:
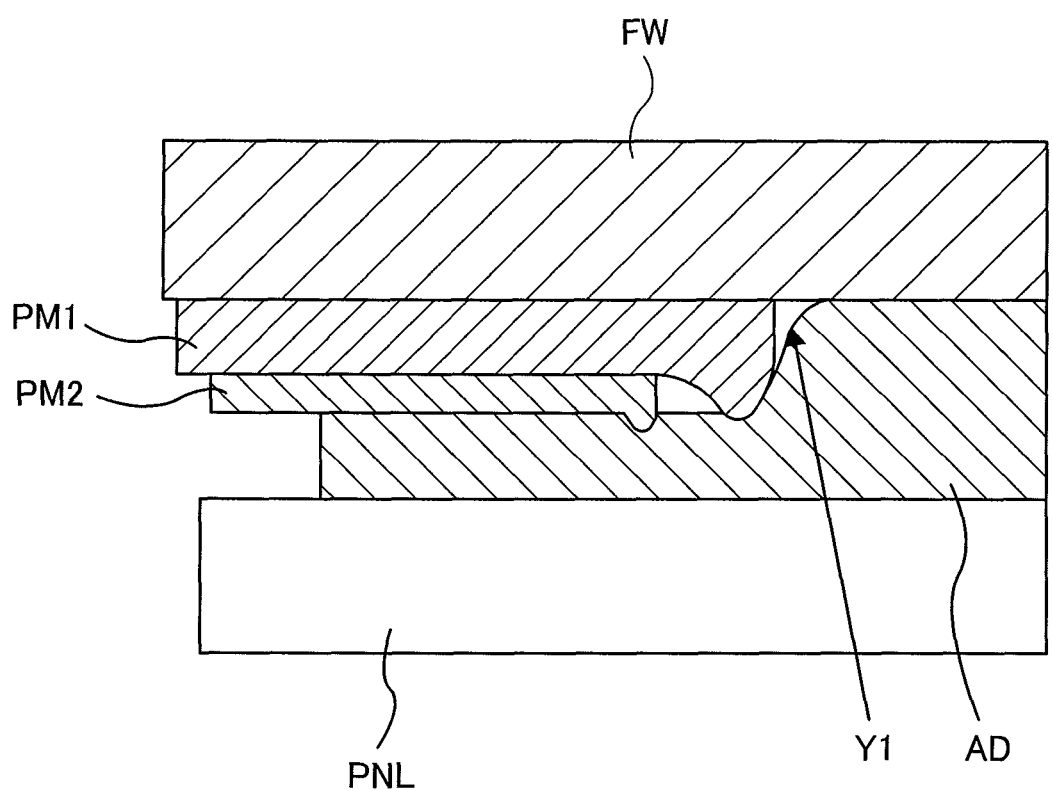
FIG. 7 is a cross-sectional view taken along line D-D shown in FIG. 6.

FIG. 5 is a front view showing a schematic configuration of a liquid crystal display device which is a display device according to a second embodiment of the present invention. FIG. 4 corresponds to FIG. 1 in the first embodiment. Note that the display device according to the second embodiment has the same configuration as the first embodiment, except for the formation position of the second light shielding film PM2, namely, the area RM where the second light shielding film PM2 is not formed. Thus, the second light shielding film PM2 will be described in detail below.

Also in the display device according to the second embodiment, similarly to the first embodiment, the drive circuit of the liquid crystal display panel is mounted on the lower edge of the display panel not shown (on the lower side of the display panel in the figure). Then, the flexible wiring substrate is connected to the drive circuit to input control signals. At this time, the width of the light shielding film PM formed along the lower peripheral portion, which is the side on which the drive circuit and other components are mounted, is made larger than the width of the light shielding film PM formed along the other three peripheral portions. However, it is also possible that the width of the long sides of the light shielding film PM, which are the sides crossing the side on which the drive circuit is mounted, is smaller than the width of the side on which the drive circuit and other components are mounted and the opposite side, namely, the short sides of the light shielding film PM. Note that, similarly to the first embodiment, the width of the light shielding film PM may be the same in all sides.

Further, as is apparent from FIG. 5, in the light shielding film PM according to the second embodiment, the first light shielding film PM1 is formed along the peripheral portion of the protective plate FW, and the second light shielding film PM2 is formed on the three sides, except for the lower edge side of the display device, namely, the side portion in which the drive circuit is mounted. In other words, in the configuration of the light shielding film PM according to the second embodiment, the second light shielding film PM2 is not formed on the side portion in which the drive circuit and other components are mounted. Also, the second light shielding film PM2 is not formed in the two corner portions that share the side portion in which the drive circuit and other components are mounted. In other words, in the configuration of the second embodiment, it is possible to prevent the drive circuit and other components mounted on the display panel from being viewed from the observer side. Further, only the first shielding film PM1 is formed in the portion where the protective plate FW extends over the area where the drive circuit and other components are mounted, in order to protect the drive circuit and other components. Thus, also in the display device according to the second embodiment, the same effect as the first embodiment can be obtained.

At this time, in the side portion in which the drive circuit and other components are mounted, it is necessary to provide the area for mounting the drive circuit as well as the area for forming the connection terminal portion of the flexible wiring substrate. In general, the width of the frame area, namely, the width of the light shielding film PM in the side portion in which the drive circuit and other components are mounted, is made larger than the width in the other side portions. Thus, in the display device according to the second embodiment, it is configured such that the second light shielding film PM2 is not formed on the side portion in which the drive circuit is mounted. In other words, by increasing the accumulation of adhesive, it is possible to obtain a remarkable effect of preventing the applied adhesive from being squeezed out into the area where the drive circuit and the connection terminal portion are formed. As a result, it is possible to significantly improve the reliability of the display device. Note that when the protective plate FW is bonded to the front surface of the display panel PNL, the protective plate FW and the display panel PNL are bonded with the adhesive AD which is not applied to the drive circuit and the connection terminal portion. In other words, the protective plate FW is bonded with the adhesive applied to the front surface of the second substrate.

Further, the configuration in which the flexible wiring substrate is connected to one side of the protective plate FW is the same in the display panel in which a touch panel (coordinate input device) is provided on the front surface of the display panel. In other words, a signal line for inputting and outputting signals for touch position detection to/from the touch panel (in general, the flexible wiring substrate is used) is also connected to the connection terminal portion formed at the side edge on the same side on which the drive circuit and other components of the display panel are mounted. Thus, when the protective plate FW is bonded by applying the adhesive to the front surface of the display panel, namely, the front surface of the touch panel, the adhesive is generally applied so as to avoid the connection terminal portion of the touch panel. Thus, by applying the present invention, it is possible to obtain the above effect, in addition to same effect as the first embodiment also in the configuration in which the touch panel is provided on the back surface side of the protective plate FW.

Note that in the configuration of the light shielding film PM according to the second embodiment, also in one or both of the corner portions of the short side on the upper side of the figure, similarly to the first embodiment, it is possible to form the cut-out area RM which is the area where the second light shielding film PM2 is not printed. In this case, it is possible to obtain the effect described in the first embodiment, in addition to the effect of the second embodiment. Thus, the formation of bubbles can be prevented more effectively.

Note that in the display device according to the first and second embodiments of the present invention, the light shielding film PM is formed such that the frame-like first light shielding film PM1 is printed in a circular form, and then the second light shielding film PM2 is printed so that the width of the second light shielding film PM2 is smaller than the first light shielding film PM1. However, the present invention is not limited to this configuration. For example, the light shielding film PM may be formed such that the second light shielding film PM2 is first printed on the back surface of the protective plate FW, and then the first light shielding film PM1 is printed.

Further, in the display device according to the first and second embodiments of the present invention, the light shielding film PM is formed by two layers of light shielding films (the first light shielding film PM1 and the second light shielding film PM2). However, the present invention is not limited to this configuration. The light shielding film PM may be formed by three or more layers of light shielding films. In this case, of the light shielding films except the light shielding film formed on the layer closest to the protective plate FW, at least one layer of light shielding film is not formed in the corner portion of the protective plate FW. In this way, the above effect can be obtained.

Further, in the display device according to the first and second embodiments, it is desirable to form the cut-out area RM, which is the area where the second light shielding film PM2 is not formed, in at least two corner portions sharing the side on which the end of the screen printing of the first and second light shielding films PM1 and PM2 is the inner peripheral edge of the light shielding film PM. In this case, in the formation of the projection associated with the screen printing, the difference in level caused by the formation of the light shielding film PM is greater than the film thickness, so that bubbles are more likely to occur.

It is to be understood that, while the present invention has been described in conjunction with the preferred specific embodiments thereof, the present invention is not limited to the specific embodiments and various changes and modifications can be made without departing from the scope of the present invention.

What is claimed is:

1. A display device comprising:
   a display panel;
   a protective plate, having four sides and four corners in a plan view, provided in a front surface of the display panel to protect the display panel, wherein the protective plate has a peripheral area formed by the four sides and the four corners; and
   a light shielding film formed along the peripheral area of the protective plate,
   wherein the protective plate is fixed to the front surface of the display panel by a transparent adhesive that is applied to an area between the display panel and the protective plate,
   wherein the light shielding film is formed so as to surround a display area of the display panel,
   wherein the light shielding film includes:
   a first light shielding film formed in a frame shape; and
   a second light shielding film deposited on the first light shielding film,
   wherein the second light shielding film has a cut-out area where the second light shielding film is not formed along at least one of the four corners of the peripheral area of the protective plate, and
   wherein a concave portion is formed in the light shielding film near an area of the one of the four corners, wherein the concave portion is formed from an inner peripheral edge to an outer peripheral edge of the shielding film.

2. The display device according to claim 1, wherein the first and second light shielding films are formed by printing on a surface facing the display panel of the protective plate.

3. The display device according to claim 2, wherein the cut-out area where the second light shielding film is not formed is formed along all four of the corners of the peripheral area of the protective plate.

4. The display device according to claim 2, wherein the first light shielding film and/or the second light shielding film is formed by a single layer of light shielding film formed by one-time printing, respectively.

5. The display device according to claim 2, wherein the cut-out area where the second light shielding film is not formed along at least two corners of the four corners, sharing one of the four sides where a drive circuit for driving the display panel is mounted.

6. The display device according to claim 5, wherein the second light shielding film is not formed in the side portion in which the drive circuit is mounted.

7. The display device according to claim 1, wherein the cut-out area where the second light shielding film is not formed is formed along all four of the corners of the peripheral area of the protective plate.

8. The display device according to claim 1, wherein the first light shielding film and/or the second light shielding film is formed by a single layer of light shielding film formed by one-time printing, respectively.

9. The display device according to claim 1, wherein the cut-out area where the second light shielding film is not formed along at least two corners of the four corners, sharing one of the four sides where a drive circuit for driving the display panel is mounted.

10. The display device according to claim 9, wherein the second light shielding film is not formed in the side portion where the drive circuit is mounted.

11. The display device according to claim 1, the first light shielding film is formed by laminating one or more light shielding layers.

* * * * *